H. K. PORTER.
Top-Prop for Carriages.
No. 220,493.         Patented Oct. 14, 1879.
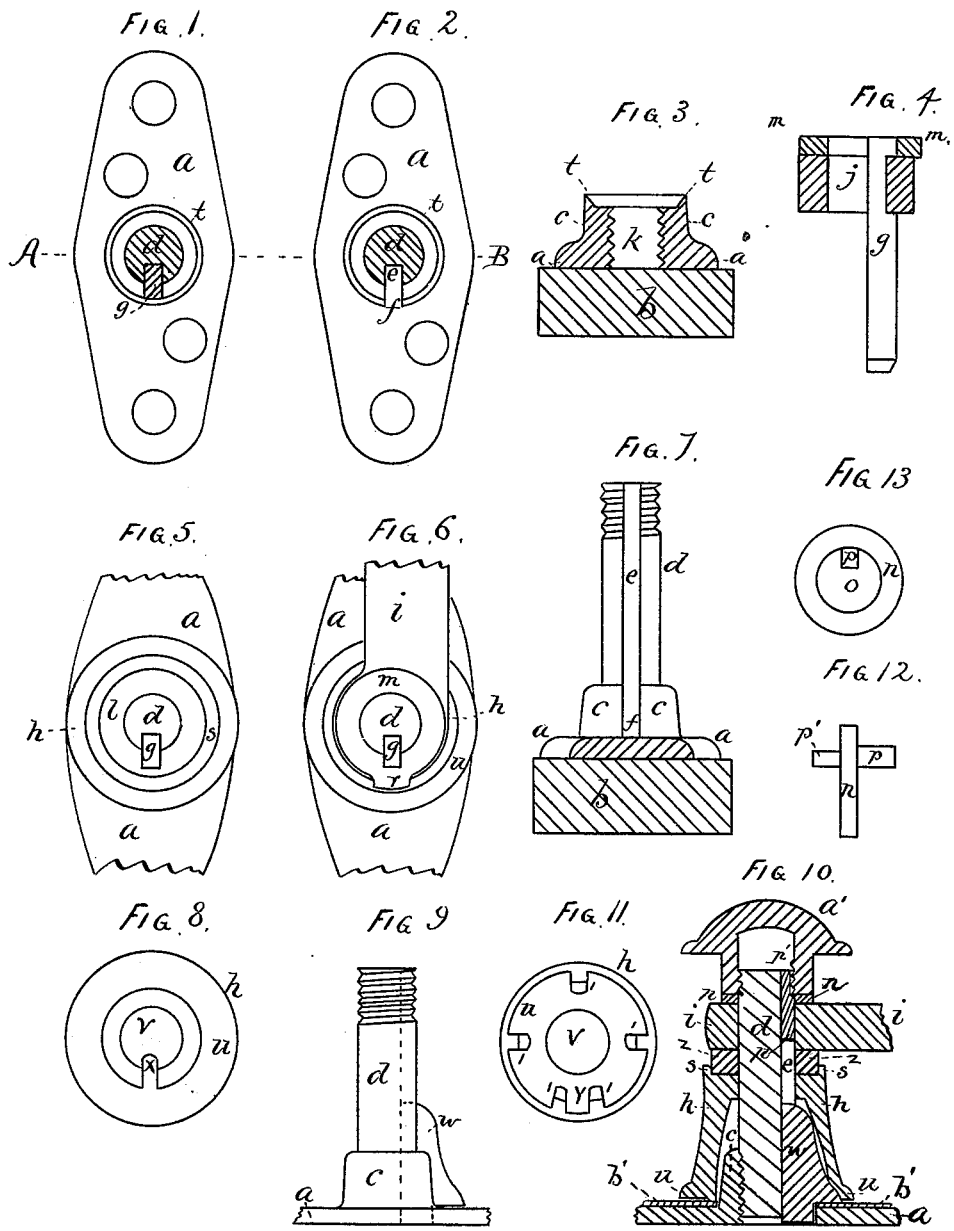
WITNESSES.
Samuel D. Kelley,
Freeman C. Goodnow
INVENTOR.
Henry K. Porter
By Porter & Hutchinson
Attys

UNITED STATES PATENT OFFICE.

HENRY K. PORTER, OF BOSTON, MASSACHUSETTS.

IMPROVEMENT IN TOP-PROPS FOR CARRIAGES.

Specification forming part of Letters Patent No. 220,493, dated October 14, 1879; application filed May 31, 1878.

*To all whom it may concern:*

Be it known that I, HENRY K. PORTER, of Boston, State of Massachusetts, have invented Improvements in Carriage Top-Props, of which the following is a specification.

This invention relates to the props which are secured to the top-bows of carriages, and to which the eyes of the top-joints are attached, and which serve as the pivotal supports of such joints; and the invention consists in improvements in various of the parts, and in combinations of parts; and, first, in a bow-plate formed with a slotted boss, a stud threaded in such boss and coincidently slotted, and a spline fitting such slots to prevent the rotation of the stud; second, in an inclosing collar formed with an internal spline, so as to be interlocked with such stud and boss by means of such internal spline fitting the slots in such boss and stud; third, in combination with such slotted stud, a spline formed in such collar, or otherwise, and projecting beyond the outer face of the collar, and having a seat or recess to receive the top-joint eye; fourth, in combination with such slotted stud, an outer washer fitting thereon and interlocking therewith, either by projecting into such slot, or by a spline entering both such stud and washer, to prevent the unscrewing of the cap-nut on the stud; fifth, in a concentric cutting-edge, formed at the outer periphery of the boss on the bow-plate, for cutting the hole for the boss in the top-leather; sixth, in a recess formed in the outer face of the collar for seating an elastic washer to cushion the top-joint; seventh, in the combination, with the collar formed with a recess in the outer end, of the elastic washer to cushion the top-joint; eighth, in a washer formed with a spline projecting within the periphery of the hole in such washer, and extending beyond the plane or planes of such washer, all as will, by the aid of the accompanying drawings, be hereinafter more fully described.

Figure 1 is a top or plan view of the bow-plate with the collar removed, and showing the stud and spline in transverse section. Fig. 2 is a view similar to Fig. 1, but showing the spline removed and the slot in the boss extending out through the same. Fig. 3 is a section as taken on line A B, Figs. 1 and 2, and showing the bow and bow-plate in transverse section and the boss in the axial line of the threaded hole for the stud. Fig. 4 is a perspective view of the removable spline, and showing the eye of the top-joint and the slotted washer in diametric section. Fig. 5 is a top or plan view, showing the bow-plate, the collar with an annular recess for the elastic washer, the stud, and the spline, the ends of the bow-plate being broken away. Fig. 6 is a view similar to Fig. 5, but showing the top-joint and slotted washer in position on the stud. Fig. 7 shows the bow and bow-plate in transverse section, and the slotted boss and slotted stud in elevation, the collar and other parts being removed. Fig. 8 is an under-side or base view of the collar, showing the spline formed as a part thereof, and projecting within the circle of the passage for the reception of the stud. Fig. 9 is an elevation, showing the stud inserted in the boss of the bow-plate, and showing a modification of the spline, the slot in the stud and boss being shown by dotted lines. Fig. 10 is a section taken through the axis of the stud in the center of the slot therein, and showing the bow-plate and its boss, the top-leather, the stud, and the collar, with the elastic washer in the recess of the collar, the spline, the top-joint eye, and the cap-nut, all in their respective positions. Fig. 11 is a base or under-side view of the collar shown in Fig. 10. Fig. 12 is an edge elevation of the washer formed with a spline within the periphery of the hole. Fig. 13 is a side elevation of the washer as viewed from the right of Fig. 12.

In these views, *a* represents the bow-plate, which is the base of the prop, and *b* is a top bow. *c* is the boss formed on plate *a*. *d* is the stud, threaded in boss *c*. *e* is the slot or splineway in stud *d*. *f* is the slot in boss *c*. *g* is the removable spline. *h* is the collar. *i* is the top-joint. *j* is the hole in the eye of the top-joint. *k* is the threaded hole in boss *c* to receive stud *d*. *l* is the seat in collar *h* for washer *z*, which is encircled by rim *s*. *m* is the washer formed with a hole to receive stud *d*, and slotted at *r* to receive spline *g*. *n* is the splined washer. *o* is the hole through the same. *p* is the major, and *p'* the minor, members of the spline. *t* is the concentric cutting-edge of boss *c*. *u* is the base of the collar *h*.

$v$ is the hole through the smaller end of the collar. $w$ is a modified removable spline, which obviates the necessity of a slot the entire length of the collar. $y$ is a recess between two of the ribs 1, formed inside the collar shown in Fig. 11, to receive the spline shown at $w$ in Figs. 10 and 11. $z$ is the elastic washer.

$a'$ is the cap-nut, threaded on stud $d$, and which secures the parts together. $b'$ is the top-leather, as shown in section in Fig. 10.

By thus forming boss $c$ with the slot $f$, and the stud $d$ with slot $e$, and combining therewith a removable spline, the stud may be removable, yet is held from rotation by the spline when in position, which latter also secures the collar from rotation when the top-joints are actuated.

In Fig. 4 the spline $g$ is shown as formed with a seat or recess corresponding to the thickness of the eye of top-joint $i$, the spline projecting beyond the outer face of the eye a sufficient distance to receive the slotted washer $m$, so that the spline fills the slot in the stud, thereby furnishing an entire bearing for eye $j$, and also securing the washer from rotation, thereby preventing the cap-nut $a'$, which is outside the washer, from being unscrewed by the action of the joints $i$.

The slot in collar $h$ which corresponds with spline $g$, as shown in Fig. 5, is formed in the act of casting the collar. Instead of a spline extending to the outside of the top-joint $i$, it may be formed like that shown in Figs. 9 and 10, which is shorter and wider at the base, so as to be in contact with the collar at its wider part.

The collar may be formed with a slot, as in Fig. 10, or with a recess, $y$, between the projecting ribs 1 1, as shown in Fig. 11. When this short spline is used, a washer, $n$, is employed instead of washer $m$, a spline, $p\ p'$ being formed upon the same, and extending within its internal periphery, the part $p$ filling the slot in the stud, while the part $p'$ is so far reduced as not to interfere with the threads of the cap-nut, as shown in Fig. 10.

All the other constituent parts of the prop being removable from the bow-plate, the latter may be first secured to the bows, then the covering-leather fitted and secured in place, when the holes in the leather for the bosses $c$ may be cut, in order that the stud may be screwed into the boss; and in order that such hole for the boss may be cut with the greatest precision and facility, I form the face of the boss with the cutting-edge $t$, as shown in Figs. 1, 2, 3, so that when the leather is in position it is only necessary to strike it with a wooden mallet over the boss, when the edge is forced through it.

The elastic washer $z$, being inclosed within the circular rim $s$, is secured from being flattened and displaced by the action of the joint-eye when it is rotated on the stud.

Instead of the removable spline, it may be cast within the chamber or cavity, and as a part of the collar, as shown at $x$, Fig. 8, which would, by its contact with the slotted boss and stud, secure them from rotation.

I do not claim, broadly, a top-prop having the collar held from rotation by its contact with the bow-plate or its boss, and the stud held from rotation by the contact of the collar therewith, as I am aware that top-props embodying such features constitute the subject-matter of several patents; but What I do claim is—

1. In a top-prop, a bow-plate having a slot, $f$, formed in the boss $c$, and the stud $d$, having a corresponding slot, $e$, and a spline fitting into such slotted boss and stud, substantially as specified.

2. In a top-prop, and in combination with a slotted bow-plate, boss $c$, and the stud $d$, having a uniform diameter throughout its length, and with a slot within its cylindrical periphery, an inclosing collar fitting thereon, and interlocking therewith by a spline entering both such stud and boss, substantially as specified.

3. In a top-prop, and in combination with the stud $d$, having a slot, $e$, a spline fitting in such slot, and constructed and arranged to extend through the eye of the top-joint and furnish a seat therefor, substantially as specified.

4. In a top-prop, and in combination with the slotted stud $d$, a washer fitting thereon and interlocking therewith by a spline entering both such stud and washer, substantially as specified.

5. In a top-prop, the boss $c$, formed with a cutting-edge, $t$, substantially as specified.

6. In a top-prop collar, the seat $l$, with the encircling rim $s$, substantially as specified.

7. In a top-prop, in combination with the collar having the recessed seat $l$, the elastic cushion $z$, substantially as specified.

8. The washer $n$, formed with the spline projecting within the inner periphery of the washer and beyond the plane or planes thereof, substantially as and for the purposes specified.

HENRY K. PORTER.

Witnesses:
T. W. PORTER,
EUGENE HUMPHREY.